United States Patent
Pruett et al.

(10) Patent No.: US 7,122,080 B2
(45) Date of Patent: Oct. 17, 2006

(54) INTEGRATED PROCESS FOR SIMULTANEOUS BENEFICIATION, LEACHING, AND DEWATERING OF KAOLIN CLAY SUSPENSION

(75) Inventors: Robert J. Pruett, Milledgeville, GA (US); Jun Yuan, Warner Robins, GA (US); Christopher R. L. Golley, Sandersville, GA (US); Michael J. Garska, Sandersville, GA (US)

(73) Assignee: Imerys Pigments, Inc.

( * ) Notice: Subject to any disclaimer, the term of this patent is extended or adjusted under 35 U.S.C. 154(b) by 134 days.

(21) Appl. No.: 10/214,359

(22) Filed: Aug. 8, 2002

(65) Prior Publication Data

US 2003/0141224 A1 Jul. 31, 2003

Related U.S. Application Data

(60) Provisional application No. 60/318,877, filed on Sep. 14, 2001.

(51) Int. Cl.
*C04B 14/04* (2006.01)

(52) U.S. Cl. .................. 106/487; 106/486; 106/488; 209/5; 209/7; 501/148

(58) Field of Classification Search .............. 209/5, 209/7; 106/486, 487, 488; 501/148
See application file for complete search history.

(56) References Cited

U.S. PATENT DOCUMENTS

| | | | |
|---|---|---|---|
| 1,791,959 A | 2/1931 | Feldenheimer | |
| 2,339,594 A | 1/1944 | Williams | |
| 3,477,809 A * | 11/1969 | Wayne et al. | 423/122 |
| 3,655,038 A | 4/1972 | Mercade | |
| 3,655,417 A * | 4/1972 | Chapman | 106/488 |
| 3,701,417 A | 10/1972 | Mercade | |
| 3,837,482 A | 9/1974 | Sheridan, III | |
| 3,857,781 A | 12/1974 | Maynard | |
| 3,937,632 A | 2/1976 | Nott | |
| 4,002,487 A | 1/1977 | Conley | |
| 4,018,673 A | 4/1977 | Hughes et al. | |
| 4,186,027 A | 1/1980 | Bell et al. | 106/288 |
| 4,227,920 A | 10/1980 | Chapman et al. | |
| 4,472,271 A | 9/1984 | Bacon, Jr. | |
| 4,604,369 A * | 8/1986 | Shi | 501/148 |
| 4,650,521 A | 3/1987 | Koppelman et al. | |
| 4,859,246 A | 8/1989 | Sennett | |
| 5,061,461 A * | 10/1991 | Sennett et al. | 423/112 |
| 5,168,083 A * | 12/1992 | Matthews et al. | 501/146 |
| 5,223,463 A | 6/1993 | Bilimoria et al. | |
| 5,227,349 A * | 7/1993 | Matthews et al. | 501/145 |
| 5,522,924 A * | 6/1996 | Smith et al. | 106/488 |
| 5,535,890 A | 7/1996 | Behl et al. | |
| 5,584,394 A * | 12/1996 | Behl et al. | 209/5 |
| 5,603,411 A | 2/1997 | Williams et al. | |
| 5,631,080 A * | 5/1997 | Fugitt | 428/331 |
| 5,685,900 A | 11/1997 | Yuan et al. | |
| 3,735,946 A * | 4/1998 | Bloodworth et al. | 106/486 |
| 5,922,207 A * | 7/1999 | Willis et al. | 210/710 |
| 5,938,833 A | 8/1999 | Willis et al. | |
| 6,007,618 A * | 12/1999 | Norris et al. | 106/487 |
| 6,041,939 A | 3/2000 | Shi et al. | |
| 6,068,693 A | 5/2000 | Garforth et al. | |
| 6,149,723 A | 11/2000 | Pruett et al. | |
| 6,200,377 B1 * | 3/2001 | Basilio et al. | 106/486 |
| 6,235,107 B1 * | 5/2001 | Yuan | 106/487 |
| 6,537,363 B1 * | 3/2003 | Golley et al. | 106/486 |
| 6,564,199 B1 * | 5/2003 | Pruett et al. | 106/486 |
| 6,610,137 B1 * | 8/2003 | Golley et al. | 106/486 |
| 2005/0178514 A1 * | 8/2005 | Pring et al. | 162/135 |

FOREIGN PATENT DOCUMENTS

| | | |
|---|---|---|
| GB | 1043252 | 9/1966 |
| WO | WO 93/00999 | 1/1993 |
| WO | WO 98/50161 | 11/1998 |
| WO | WO 00/68160 | 11/2000 |

OTHER PUBLICATIONS

Jessica Elzea Kogel et al., "Geology of the Commerial Kaolin Mining District of Central and Eastern Georgia," *Georgia Geological Society Guidebooks*, vol. 20, No. 1, Oct. 2000, pp. 52–56.

\* cited by examiner

*Primary Examiner*—Donald L. Wilson
*Assistant Examiner*—Matthew J. Kohner
(74) *Attorney, Agent, or Firm*—Finnegan, Henderson Farabow, Garrett & Dunner, LLP

(57) ABSTRACT

The present invention provides an improved method of beneficiating and dewatering kaolin clays. The product of the improved process is a brightened, dewatered kaolin, suitable for use in pigments and paper coating compositions. The improved beneficiation process provides refined kaolin for pigments and other purposes of the same or better quality as prior art processes, but with the use of fewer steps and materials, at significant cost and environmental savings.

39 Claims, No Drawings

INTEGRATED PROCESS FOR SIMULTANEOUS BENEFICIATION, LEACHING, AND DEWATERING OF KAOLIN CLAY SUSPENSION

RELATED APPLICATION

This application claims the benefit of U.S. Provisional Application No. 60/318,877, entitled "Integrated process for simultaneous, beneficiation, leaching and dewatering of a kaolin clay suspension," filed Sep. 14, 2001, which is hereby incorporated by reference in its entirety.

DESCRIPTION OF THE INVENTION

Field of the Invention

The present invention provides an improved method of beneficiating and dewatering kaolin clays. The product of the improved process is a brightened, dewatered kaolin, suitable for use in pigments and paper coating compositions. The improved process is in part the result of a change in the way kaolin beneficiation processes involving selective flocculation, reductive leaching, and dewatering are carried out. The improved beneficiation processes provides refined kaolins for pigments and other purposes of the same or better quality as prior art processes, but with the use of fewer steps and materials, at significant cost and environmental savings.

BACKGROUND OF THE INVENTION

Large amounts of kaolin find use as pigments and as filler material in paper coating compositions. Kaolinite, the principal constituent of kaolin clay (or kaolinitic clay), is a white clay mineral that imparts brightness, gloss, smoothness and other desirable properties to the surface of coated paper, paper board, super-calendared paper, and other paper related products.

Kaolin is a clay, mined from clay deposits found in various locations around the globe. For instance, Kaolin ores are mined today from deposits located in the United Kingdom, France, Germany, and the Czech Republic. Kaolin deposits present in these locations are generally of the primary type. Primary kaolin deposits were formed through the weathering of feldspar, a group of rock forming minerals that comprise more than half the volume of the earth's crust. Kaolin clays are also mined today from deposits located in Brazil and the Southeastern U.S.A. Kaolins mined from these locations are generally of the secondary (or sedimentary) type. Secondary deposits are formed by sedimentation, a geological process that deposits kaolin within sedimentary rock.

Both types of kaolin clay deposits invariably contain coarse and fine impurities that must be removed prior to use. Coarse impurities, which can comprise more than half the crude volume, include +325 mesh-sized particles of quartz, feldspar, mica, or tourmaline. Fine impurities include silt- and clay-sized non-kaolin minerals, fine sand, and minerals. Sedimentary kaolin often contains titania mineral impurities, such as anatase and rutile. These titania minerals can contain lattice substituted iron that imparts a brown to yellow color. Along with titania, sedimentary kaolin often contains a small percentage of associated iron oxides and iron sulfides. Iron oxide minerals, such as hematite and goethite, impart a dull yellow-to-red color. Iron sulfide minerals, such as marcasite and pyrite, typically occur in kaolins containing organic matter. Iron sulfide minerals may occur as +325 mesh sized nodules, or be disseminated with organic matter to impart a gray color. Even in small quantities, these impurities can reduce the brightness and whiteness of pigments derived from kaolin. Because bright, white pigments are generally preferred over dull, yellow pigments, great effort has been made to develop processes to remove such impurities prior to use.

Wet mineral separation processes have been designed to remove impurities, or otherwise improve the characteristics of final kaolin products. In general, these processes are called beneficiation. Some beneficiation processes, including degritting and desanding, are designed to the remove sand, coarse silt, and other coarse particles that would detract from the physical properties of the final pigment. Other beneficiation processes are designed to remove fine impurities, or to improve the color, texture, or rheological properties of the final product.

The wet process is accomplished by first mixing crude clay with water to form aqueous mineral slurries, called slip. Where kaolin is mined dry, slip is formed by mixing—or blunging—dry or moist crude clay with water to produce an aqueous suspension having between 35% and 70% solids. The clay slurry is then degritted by passing it through a series of drag boxes, bucket-wheel desanders, hydrosizers, hydrocyclones, sieves, and/or screens, to separate the coarse materials. Alternatively, or subsequent to desanding, the crude slurry is left to stand for a period of time in settling bowls or thickeners, to allow the coarse particles to separate from the fine in a process called sedimentation. See for instance the Background section of Pruett et al., U.S. Pat. No. 6,149,723, which is incorporated herein by reference.

To increase the efficiency of degritting processes, it has long been known to deflocculate the clay slurry prior to degritting. Flocculation is the result of kaolin particles' tendency to adhere to one another and form aggregates, agglomerates, or flocs. Kaolinite particles will flocculate in strongly to weakly acidic environments, as positive and negative charges, present on the edges and faces of the kaolin particles, bring kaolin particles together. Flocculation causes the viscosity of clay-water slurries to rise. It also interferes with the degritting process by inhibiting coarse particles from settling out, causing flocs of fine clay particles to settle with coarse particles, and causing fine particles attached to coarse particles to be removed with the coarse particles. Deflocculation causes the particles to disperse. Dispersion helps liberate the particles and facilitate size and mineral separation.

Deflocculation is accomplished by mixing chemicals into the slurry that raise the pH (typically to 6 or higher). The increased alkalinity renders the kaolinite surfaces predominately negatively charged, and decreases the attractive forces among the particles. Deflocculation is aided further by the addition of dispersing agents, which minimize Van der Waal attraction among the particles.

Additional beneficiation of dispersed kaolin slip typically precedes or follows degritting, and accomplishes a variety of purposes. The selection of the beneficiation process used depends on the type of crude used, and on the specifications required of the final refined product. For instance, one may improve performance or brightness of a kaolin pigment through particle size classification. Classification processes select, or fractionate, particles conforming to certain ranges of particle shapes and/or sizes, called particle size distributions (psd). Classification, may be accomplished by, e.g., centrifugation as described, for example, by Hughes et al., U.S. Pat. No. 4,018,673, incorporated herein by reference. One may improve the color through various other beneficiation processes, including floatation (U.S. Pat. No. 3,655,038), froth floatation (U.S. Pat. No. 4,472,271 and EP 591406), magnetic separation (WO 9850161), reduced acid leaching or alkaline bleaching (U.S. Pat. No. 4,650,521), and selective flocculation. See U.S. Pat. Nos. 3,701,417, 5,685,900, 5,535,890, 4,227,920, and 6,068,693, incorporated herein by reference, or for variations thereof, Provisional U.S. Application No. 60/240,861.

Selective flocculation is a preferred way to remove titania, when present as an impurity. In some selective flocculation methods, kaolin containing titania (and other fine impurities) is mixed with additives that cause the titania to flocculate, settle to the bottom of a thickener or settling bowl, and leave the product kaolin to be recovered from the supernatant in dispersed form. See, for example, U.S. Pat. Nos. 3,701,417 and 6,068,693. The efficiency of selective flocculation can be improved by performing the reverse: i.e., by flocculating and recovering the kaolin component, and leaving the impurities to separate in the aqueous supernatant. See U.S. Pat. Nos. 5,535,890, and 4,227,920. In such processes, the kaolin is first dispersed by adding chemicals that increase its alkalinity. Dispersing agents are also optionally added. High molecular weight polymers are then added to the dispersed aqueous kaolin suspension. The suspension is then flocculated. During flocculation, the high molecular weight polymers adhere preferentially to kaolin, and do not attach to titania and other impurities. This facilitates titania separation. After separation, the flocculated kaolin portion is deflocculated chemically, e.g., by ozonation, chemical dispersants or both, or mechanically, e.g., by high shear wet milling, leaving a dispersed kaolin slip substantially free of titania and other impurities. See U.S. Pat. No. 5,685,900, incorporated herein by reference.

For crudes having iron oxides as an impurity, a beneficiation process called reduced acid leaching has been used to improve the color of the beneficiated product. According to long established practice, reduced acid leaching requires acidifying a dispersed (optionally degritted and beneficiated) clay slip to a pH range below 5, and typically below 3, to flocculate the clay particles. A chemical reducing agent is then added to the flocculated kaolin suspension. The reducing agent reacts with iron oxides, irreversibly converting them from water-insoluble ferric (iron III) oxides to the water-soluble ferrous (iron II) form. See, e.g., GB 1,043,252. Once solubilized, the iron was thought to leach into the aqueous portion of the clay slurry along with other water-soluble salts, and thereby separate from the flocculated kaolin. See generally U.S. Pat. Nos. 1,791,959; 2,339,594; 3,937,632; 4,002,487; and G.B. 1,043,252, incorporated herein by reference.

While most beneficiation processes may be carried out in any expedient order, it was thought necessary to save reduced acid leaching until the final stages of beneficiation, and after selective flocculation. This is because reduced acid leaching was performed on acid-flocculated clay slip and must be followed by filtration to remove salts to raise solids concentration for drying. Moreover, because selective flocculation requires flocculation of selected minerals from a fully dispersed slurry, it is necessary to carry out selective flocculation in alkaline conditions. (WO 00/68160 teaches a process for the selective flocculation of kaolinite, followed by ozonation, which is carried out in highly alkaline conditions, at pH levels above 9, preferably 11–11.5.) By contrast, iron removal by reductive leaching was thought to require acidic conditions that promote flocculation to enable removal of solubilized iron by filtration.

These constraints increase the cost of beneficiation for several reasons. The divergent pH requirements for reduced acid leaching and most other beneficiation processes made it impossible to combine them. Adjusting the pH to more alkaline levels required for selective flocculation of kaolinite and reverse froth floatation of anatase requires adding costly chemicals. Adjusting the pH again to acidic levels for acid reductive leaching, then again to a neutral pH prior to drying and sale, requires adding still more costly and environmentally harmful chemicals, such as sulfuric acid. Further, the pH adjusting chemicals and dispersing agents are themselves impurities whose presence at higher doses can harm the rheological characteristics (viscosity) of the final product. All of these constraints add to the cost of beneficiation. The present invention overcomes these constraints, however, and provides a beneficiated kaolin product of comparable or better quality at significant cost and environmental savings.

SUMMARY OF THE INVENTION

The present invention provides a method of beneficiating and dewatering kaolin clay comprising:

(a) obtaining a kaolin clay for which beneficiation is desired;

(b) forming an aqueous suspension of said clay;

(c) deflocculating said aqueous suspension;

(d) optionally adding a reducing agent to said deflocculated aqueous suspension;

(e) adding a high molecular weight polymer to selectively flocculate said clay suspension;

(f) separating the flocculated clay product from the remainder of the suspension;

(g) redispersing the separated clay of (f) to form a deflocculated clay product having a higher weight-percent solids content than the deflocculated aqueous suspension of (c);

(h) optionally further dewatering or drying said deflocculated clay product.

The refined kaolin product according to the present invention is suitable for use, e.g., in pigments and paper filling and/or coating compositions.

The present invention benefits, in part, from a shift in the way selective flocculation and reductive leaching are carried out. As indicated above, it was thought, prior to the present invention, that iron oxide treatment via reductive leaching must be performed in an acidic environment. It was also thought that filtration was required subsequent to reduced acid leaching to remove salts and water-solubilized ferrous to improve brightness, whiteness, and rheology of the clay-water slurry. We have found, unexpectedly and contrary to longstanding practice, that adequate treatment of iron oxide impurities need not involve acidification or subsequent filtration. Instead, treatment of iron oxide impurities can be carried out over a range of pH compatible with that used during selective flocculation.

Without wishing to be bound by theory, we believe that the reduction of ferric (iron III) oxides to ferrous (iron II) oxides increases the brightness of the iron oxide to tolerable levels by changing visible light absorbance of the iron. Such treatment, hereinafter alkaline bleaching (or alkaline leaching), allows one to treat iron oxide impurities at the same time as, or prior to, titania removal.

The invention thus avoids the additional steps required in reduced acid leaching. For instance, the invention allows one to avoid adding chemicals that acidify, then later neutralize pH to proceed from iron oxide removal (reduced acid leaching) to titania removal (selective flocculation). The decreased use of pH adjusting chemicals reduces expense and potential environmental hazards. Where pH adjusting chemicals are not added, they cannot form salts that are detrimental to rheological properties of the final product.

Thus, where the prior art regarded iron oxide, titania removal, and dewatering as necessarily separate and discrete beneficiation processes, the present invention combines them, at significant materials, cost, and environmental savings. Yet the beneficiated kaolin products of the invention compare favorably to those obtained from prior beneficiation processes.

The present invention has additional surprising features as well. It was surprising and unexpected, for instance, that the chemical reducing agent(s) used to effect alkaline bleaching do not interfere with the selective flocculation process. In particular, it was surprising that chemical reducing agents do not cause aggregation of kaolinite particles with impurities, and do not interfere with the ability of the high molecular weight polymers to selectively adhere to the kaolin and form flocs, so that other impurities can be forced into the remainder of the suspension and removed. Moreover, removal of dispersed colloidal iron impurities by selective flocculation of the kaolinite is actually enhanced. It was also surprising that, without filtration or displacive washing, chemical reducing agents do not harm the Theological properties of the final product.

Having described the invention generally, details and examples will be set forth below. It is to be understood that both the foregoing general description and the following detailed description are exemplary and explanatory only and are not restrictive of the invention, as claimed.

DETAILED DESCRIPTION OF THE INVENTION

The present invention provides a method of beneficiating and dewatering kaolin clay comprising:

(a) obtaining a kaolin clay for which beneficiation is desired;

(b) forming an aqueous suspension of said clay;

(c) deflocculating said aqueous suspension;

(d) optionally adding a reducing agent to said deflocculated aqueous suspension;

(e) adding a high molecular weight polymer to selectively flocculate said clay suspension;

(f) separating the flocculated clay product from the remainder of the suspension;

(g) redispersing the separated clay of (f) to form a deflocculated clay product having a higher weight-percent solids content than the deflocculated aqueous suspension of (c);

(h) optionally further dewatering or drying said deflocculated clay product.

The refined kaolin product according to the present invention is suitable for use, e.g., in pigments and paper filling and/or coating compositions.

The crude kaolin clay in (a) can be derived from any source, and may include, but is not limited to, any one of the following: primary kaolin, secondary (sedimentary) kaolin, micaceous kaolin, sandy kaolin, kaolinitic sandstone, saprolite, high alumina-kaolin, bauxitic kaolin, flint clay, fire clay, and ball clay. The present invention does not rely on the use of a particular feed kaolin.

The aqueous suspension formed in (b) may be obtained by any art recognized method, for example, by blunging the crude kaolin feed with water, or by hydrolic mining with use of a monitor, according to known methods. Typically a dry kaolin will be blunged such that the resulting kaolin/water composition will have a solids concentration of from 30% to 70% by weight.

The deflocculated clay suspension of (c) will typically be degritted, and optionally further beneficiated, prior to (d) and/or (e). Degritting may be accomplished according to known methods, such as those discussed in the previous section. Additional beneficiation processes include, but are not limited to, fractionation, classification, floatation, froth floatation, and magnetic separation. The solids concentration of the aqueous suspension may be diluted prior to degritting and fractionation to between 25% to 30%. Following other beneficiation procedures, and prior to selective flocculation, the slurry solids concentration will advantageously be reduced further to 10% to 20%, preferably 15%.

The deflocculation in (c) may be accomplished by any suitable method. For instance, the method could comprise the addition of one or more chemical agents capable of increasing the pH of the aqueous suspension sufficient to facilitate deflocculation. Typically the pH will be raised to between 6 and 12, more typically between 7–11.5. pH adjusting agents suitable for this purpose include sodium carbonate, sodium hydroxide, and ammonium hydroxide, or mixtures thereof, but may also include any other known or after-discovered dispersing agents capable of performing this function. One or more dispersing agents may also be optionally added to further disperse the deflocculated kaolin. Such dispersing agents include sodium polyphosphates, sodium silicates, and sodium polyacrylates, but may also include any other known or after-discovered dispersing agents capable of performing this function.

The reducing agent referred to in (d) is used to effect alkaline bleaching. As indicated in the discussion above, it is advantageous to perform alkaline bleaching when the feed clay referred to in (a) is in need of additional whitening or brightening due to the presence of iron oxide impurities.

The reducing agent referred to in (d) is preferably added prior to the addition of a high molecular weight polymer to allow time for complete mixing and action by the bleaching agent. The amount of time required will depend on the degree of mixing and other factors, and may readily be determined by those of ordinary skill in the art. Good results have been obtained by waiting from 20 minutes to 3 days, preferably 1–2 hours between adding the reducing agent and the high molecular weight polymer. The reducing agent may also be added at the same time, or after the addition of the high molecular weight polymer, however. The pH of the slurry is advantageously between 6–12, preferably 7–11.5.

The reducing agent in (d) may be either chemical (organic or inorganic) or microbiological. Preferred chemical reducing agents include sodium hydrosulfite, formamidine sulphinic acid (FAS), thiourea dioxide, and dithionate, but may also include any other known or after-discovered chemical reducing agents capable of reducing iron oxides under the conditions prescribed.

Useful microbiological reducing agents include *Aspergillus niger*, *Enterobacter aerogens* and *Leuconostoc mesenteroides*, and mixtures thereof, but may also include any other known or after-discovered microbiological reducing agents capable of performing the function under the conditions prescribed. Microbiological reducing agents may be used in processes called bioleaching. Bioleaching techniques such as those described by Shelobolina (2000) in the Georgia Geological Society Guidebook, Volume 20, titled "Geology of the Commercial Kaolin Mining District of Central and Eastern Georgia," herein incorporated by reference in its entirety, may be followed. While bioleaching requires the introduction of bacteria and nutrients, we believe that introduction of a bioleaching stage in place of inorganic or organic chemical reducing agents is made possible by the invention because the selective flocculation step enables separation of kaolinite from contaminants such as iron-bearing organic compounds, bacterial matter, nutrient matter or other residues resulting from the bioleaching process. We further believe that an oxidative process such as ozone is required after the selective flocculation process to make the kaolin product fit for use by preventing microbiological contamination of the product.

The high molecular weight polymer referred to in (e) is, optionally together with other additives, added to effect selective flocculation. Suitable high molecular weight polymers include any one or a blend of suitable polymers, including Nalco 9877, Cytec A100 LMW, Cytec A1849 RS, and Superfloc 1881, as well as any known or after-discovered agents capable of performing the function. The pH of the deflocculated suspension is advantageously raised prior to, or at the same time as, the addition of the high molecular weight polymer. Advantageously, this selective flocculation and subsequent redispersion (discussed below) is conducted at a pH of from 6 to 12. When the high molecular weight polymer is Nalco 9877 and the redispersion is accomplished with ozone, the pH will typically be higher, as from 7 to 11.5. Good results have been achieved at a pH of 11.5.

The separation between the liquid and flocculated solid referred to in (f) may be achieved by any manner known in the art. Such separation may be performed using a settling bowl, thickener, centrifuge, hydrocyclone rotary vacuum filter, low pressure filter press, high pressure filter press, or tube press. Use of a thickener or a separator designed for this application is preferred. Again, the pH of the separated product may be between 6–12, preferably between 7–11.5.

The redispersion referred to in (g) may be accomplished by various methods, depending in part upon the nature of the high molecular weight polymer used. When high molecular weight polymers such as Nalco 9877 are used, the flocculated clay product referred to in (f) may be subjected to a polymer destroying amount of at least one chemical or gaseous agent. Such chemical or gaseous agents may advantageously be oxidizing agents. Such chemical oxidizing reagents may include sodium hypochloride, hydrogen peroxide, and potassium permanganate, but may also include any known or after-discovered chemical oxidizing agent capable of performing this function. Alternatively, and preferably, the polymer destroying agent may be an oxidizing gas. Such oxidizing gasses include ozone, but may also include any known or after-discovered gaseous oxidizing agent capable of performing this function. When other high molecular weight polymers are used, redispersion may require addition of a chemical dispersant, optionally together with high shear mixing, to redisperse the flocculated kaolin. The separated, redispersed kaolin selective flocculation product will have greater than 40% solids, preferably greater than 55%.

As per (h), the product of (g) may optionally be further dewatered using a filter press, evaporator, or membrane filter or the like. The product of (g) may also optionally be further dried using known techniques and machinery, such as an apron dryer, fluid bed dryer, rotary dryer or spray dryer. Further dewatering or back mixing will typically increase the solids content to 67% to 71%. Apron or spray drying may optionally be used to increase solids to above 90%–97%.

It will be noted that all percentages expressed herein are by weight unless otherwise noted. All percentage, time, and pH values expressed herein are approximate. And all references to brightness are measured at 457 nm against MgO as per the established industry (GE) standard.

Reference will now be made to the following examples, where the following abbreviations are used:

HMP=Sodium Hexametaphosphate;

C-211=Sodium Polyacrylate;

NaOH=Sodium hydroxide (caustic soda);

Floc.=Flocculation;

Hydro=Sodium hydrosulfite (sodium dithionite);

FAS=Formamidine Sulphinic Acid;

/t=number of pounds per ton.

EXAMPLE 1

Cream Oxidized (Cream-Colored) Crude

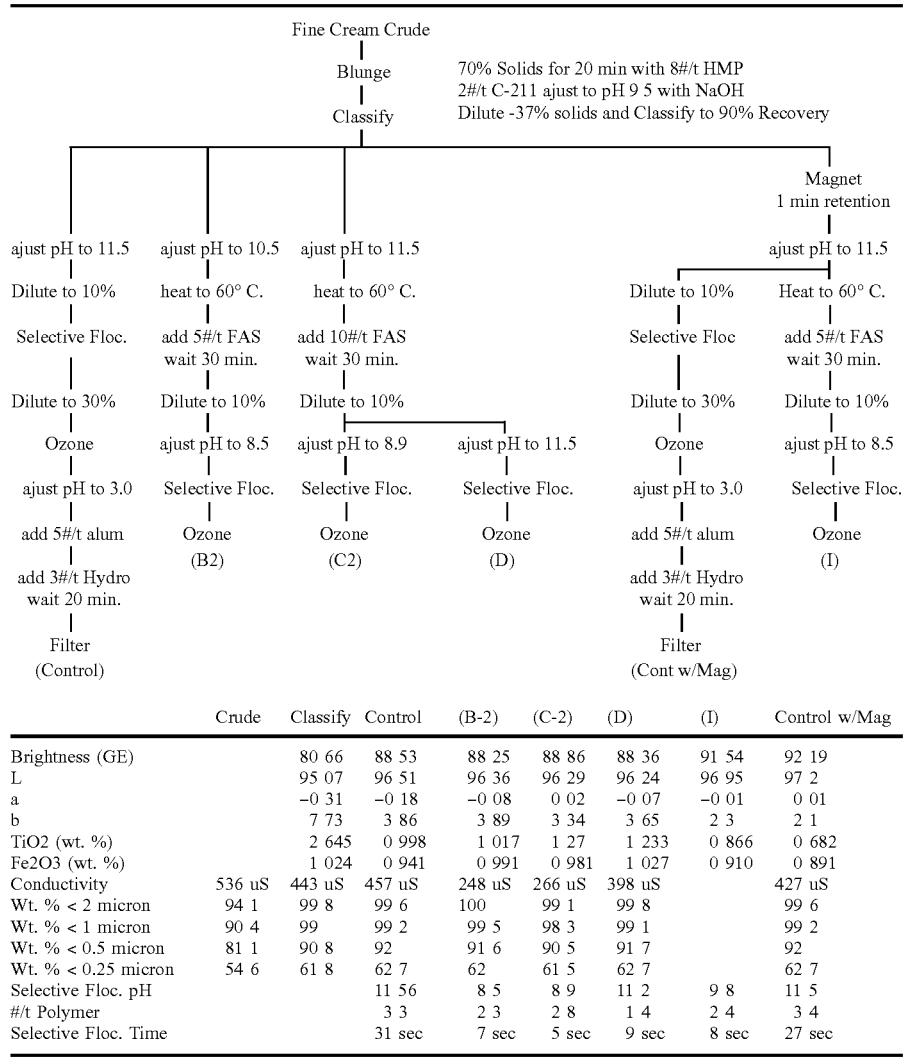

| | Crude | Classify | Control | (B-2) | (C-2) | (D) | (I) | Control w/Mag |
|---|---|---|---|---|---|---|---|---|
| Brightness (GE) | | 80 66 | 88 53 | 88 25 | 88 86 | 88 36 | 91 54 | 92 19 |
| L | | 95 07 | 96 51 | 96 36 | 96 29 | 96 24 | 96 95 | 97 2 |
| a | | −0 31 | −0 18 | −0 08 | 0 02 | −0 07 | −0 01 | 0 01 |
| b | | 7 73 | 3 86 | 3 89 | 3 34 | 3 65 | 2 3 | 2 1 |
| $TiO_2$ (wt. %) | | 2 645 | 0 998 | 1 017 | 1 27 | 1 233 | 0 866 | 0 682 |
| $Fe_2O_3$ (wt. %) | | 1 024 | 0 941 | 0 991 | 0 981 | 1 027 | 0 910 | 0 891 |
| Conductivity | 536 uS | 443 uS | 457 uS | 248 uS | 266 uS | 398 uS | | 427 uS |
| Wt. % < 2 micron | 94 1 | 99 8 | 99 6 | 100 | 99 1 | 99 8 | | 99 6 |
| Wt. % < 1 micron | 90 4 | 99 | 99 2 | 99 5 | 98 3 | 99 1 | | 99 2 |
| Wt. % < 0.5 micron | 81 1 | 90 8 | 92 | 91 6 | 90 5 | 91 7 | | 92 |
| Wt. % < 0.25 micron | 54 6 | 61 8 | 62 7 | 62 | 61 5 | 62 7 | | 62 7 |
| Selective Floc. pH | | | 11 56 | 8 5 | 8 9 | 11 2 | 9 8 | 11 5 |
| #/t Polymer | | | 3 3 | 2 3 | 2 8 | 1 4 | 2 4 | 3 4 |
| Selective Floc. Time | | | 31 sec | 7 sec | 5 sec | 9 sec | 8 sec | 27 sec |

In Example 1, a fine cream oxidized crude kaolin having a cream-color and containing titania, iron oxides, and other impurities and having conductivity and particle size distribution listed in column 1 was blunged to 70% solids for 20 minutes with 8 pounds per ton HMP and 2 pounds per ton C-211. The pH of the blunged product was adjusted to 9.5 with caustic soda, diluted to 37% solids, and classified with 90% recovery. The classified intermediate exhibited the properties listed in column 2 of the table. The classified intermediate crude was then subjected to 1) prior art beneficiation methods (control and control w/Mag) and 2) beneficiation methods according to the invention (B-2, C-2, D, and I). The control procedures were performed according the current practice of treating iron impurities (reduced acid leaching and filtration) after titania removal (selective flocculation and other beneficiation). B-2, C-2, and D show various procedures according to the invention, where iron treatment (alkaline leaching) was performed prior to titania removal (selective flocculation). "Control w/Mag" and I illustrate the impact of magnetic separation on the prior art process and a process according to the invention, respectively.

As can be seen from Example 1, when alkaline bleaching (e.g., with FAS) was performed prior to selective flocculation, a beneficiated product having superior conductivity (lower levels of salt impurities) and equivalent brightness as compared to control was achieved. (B-2, C-2, and D as compared to control; I as compared to "control w/Mag"). Example 1 also shows that the pH drop in the FAS leaching reaction is larger than the pH drop observed for the sodium hydrosulfite leaching reaction, and that settling rates and polymer dose were significantly and advantageously faster or lower for each of the inventive methods than for the controls.

EXAMPLE 2

Coarse Oxidized (Cream- to Pink-Colored) Crude

As can be seen from Example 2, the rheology (dissolved salts) of the products beneficiated according to the invention is better (A and D) or equivalent (B, C, and H) than control.

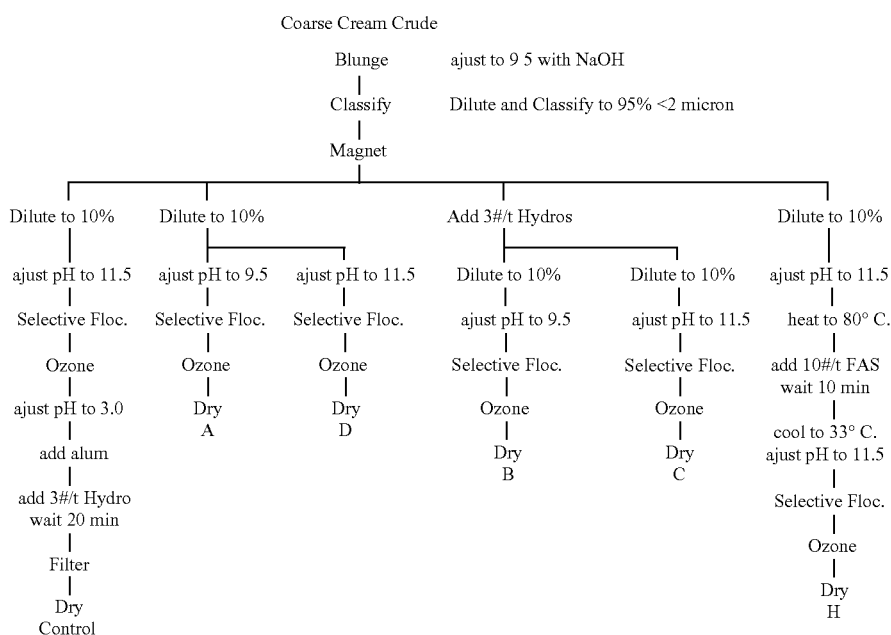

|  | Control | A | D | B | C | H |
|---|---|---|---|---|---|---|
| Brightness (GE) | 91 01 | 80 10 | 89 17 | 88 73 | 89 2 | 90 18 |
| b | 2 41 | 3 82 | 3 42 | 3 51 | 3 32 | 2 87 |
| TiO2 (wt. %) | 0 544 | 1 08 | 0 638 | 0 978 | 0 649 | 0 706 |
| Fe2O3 (wt. %) | 0 546 | 0 54 | 0 521 | 0 562 | 0 539 | 0 614 |
| Conductivity | 302 uS | 230 uS | 230 uS | 276 uS | 394 uS | 440 uS |
| Brookfield viscosity, 70% solids @ 20 rpm | 395 | 275 | 250 | 390 | 385 |  |
| Hercules, 70% solids, rpm @ 18 dynes (4400 rpm) | 630 | 1100 | 1200 | 660 | 940 |  |

In Example 2, a fine cream oxidized crude kaolin having a cream-to-pink color was blunged with caustic soda to a pH of 9.5, diluted to about 37%, and classified to 95% less than 2 microns, and subjected to magnetic separation. The intermediate was diluted to 10% solids and then subjected to both prior art (control) and inventive (A, D, B, C, and H) beneficiation procedures. The dilute intermediate was then subjected to both prior art (control) and inventive (A, D, B, C, and H) beneficiation procedures. The control illustrates the current practice of leaching (this time using hydro (sodium hydrosulfite)) and filtering after beneficiation (selective flocculation). Procedures A, D, B, C, and H illustrate procedures according to the invention, employing selective flocculation, optionally together with prior treatment with alkaline leaching (hydros or FAS).

Example 2 also shows that selective flocculation can be done with leach added before separation of flocculated clay, and that leaching before selective flocculation yields products having slightly lower b-value than selective flocculation alone. The invention described in Example 2 (A–D, H) does not describe an optimized chemistry to achieve equal performance to the Control in all properties, but the example demonstrates that commercial grade kaolin product with greater than 87 GE brightness and acceptable rheology can be produced from coarse oxidized crude by eliminating the acid leach and filter conditions typical of current commercial practice described by the control. The invention demonstrates elimination of two chemical additions points and elimination of expensive process equipment associated with filtration.

EXAMPLE 3

Fine Gray Crude

```
                                  Fine Gray Crude
                                         |
              ┌──────────────────────────┴──────────────────────────┐
      Blunge   70% Solids for 20 min with 8#/t HMP        Blunge   70% Solids for 20 min with 8#/t HMP
        |     1#/t C-211 ajust to pH 9 5 with NaOH          |     1#/t C-211 ajust to pH 9 5 with Na2CO3
     Classify  Dilute and Classify to 92% Recovery       Classify  Dilute and Classify to 93% Recovery
        |                                                   |
    ┌───┴────┐                                          ┌───┴────┐
Dilute to 10% Dilute to 10%                        Dilute to 10% Dilute to 10%
    |            |                                      |            |
ajust pH to 8.5  ajust pH to 11.5                  ajust pH to 8.5  ajust pH to 11.5
    |            |                                      |            |
Selective Floc.  Selective Floc.                   Selective Floc.  Selective Floc.
    |            |                                      |            |
  Ozone        Ozone                                  Ozone        Ozone
   (A)          (B)                                    (G)          (I)
```

| | Blunge | Classify | A | B | Classify | G | I |
|---|---|---|---|---|---|---|---|
| Brightness (GE) | 83.21 | 84.03 | 87.84 | 90.58 | 84.31 | 90.84 | 88.74 |
| L | 93.48 | 93.78 | 95.43 | 96.39 | 93.83 | 95.91 | 95.36 |
| a | −0.17 | −0.01 | −0.23 | −0.14 | −0.08 | −0.17 | −0.03 |
| b | 3.61 | 3.4 | 2.86 | 2.16 | 3.27 | 1.86 | 2.07 |
| TiO2 (wt. %) | 2.801 | 2.543 | 1.848 | 0.807 | 2.519 | 0.802 | 0.89 |
| Fe2O3 (wt. %) | 0.982 | 0.94 | 0.944 | 0.955 | 0.932 | 0.975 | 0.981 |
| Conductivity | | | 297 uS | 400 uS | | | |
| Wt.% <2 micron | 95.7 | 98.7 | 98.9 | 98.8 | 98.9 | | |
| Wt.% <0.5 micron | 79.4 | 84.1 | 84.1 | 82.9 | 82.6 | | |
| Wt. % <0.25 micron | 57.7 | 59.7 | 80.1 | 57.5 | 59.4 | | |
| Selective Floc Time | | | 6.5 min | 11 sec | | 69 sec | |
| #/t Polymer | | | 3.75 #/t | 2.5 #/t | | 3.75 #/t | 3.3 #/t |
| Product pH | | | 7.5 | 9.1 | | | |

In Example 3, a fine gray kaolin crude was divided into two lots. A first lot was blunged to 70% solids for 20 minutes with 8 pounds per ton HMP. The pH of the blunged product of the first lot was adjusted to 9.5 with caustic soda, diluted to about 37% solids, and classified to 92% recovery. A second lot was blunged to 70% solids for 20 minutes with 8 pounds per ton HMP. The pH of the blunged product of the second lot was adjusted to 9.5 with Na₂CO₃, diluted to about 37% solids, and classified to 93% recovery. Each of the two lots were further diluted to 10% solids and divided, and their pH adjusted to 8.5 and 11.5, receptively. Properties of the blunged and classified crude and beneficiated product are listed in the table.

As can be seen from Example 3, reductive leaching is not required to obtain brightness for some fine gray kaolin crudes. Selective flocculation is better at high (11.5) pH as compared to lower (8.5) pH when caustic soda is used. Selective flocculation performed at lower pH yields product with lower conductivity, which equates to better rheology. And selective flocculation works at lower (8.5) pH when sodium carbonate is used to adjust pH during blunging.

The invention described in Example 3 does not describe an optimized chemistry from a fine gray crude, but the example demonstrates that commercial grade kaolin product with greater than 87 GE brightness and acceptable rheology can be produced from fine gray crude by eliminating the acid leach and filter conditions typical of current commercial practice described by the control. The invention demonstrates elimination of three chemical additions points and elimination of expensive process equipment associated with filtration can be eliminated.

EXAMPLE 4

Fine Gray Crude-Continuous Process Conditions

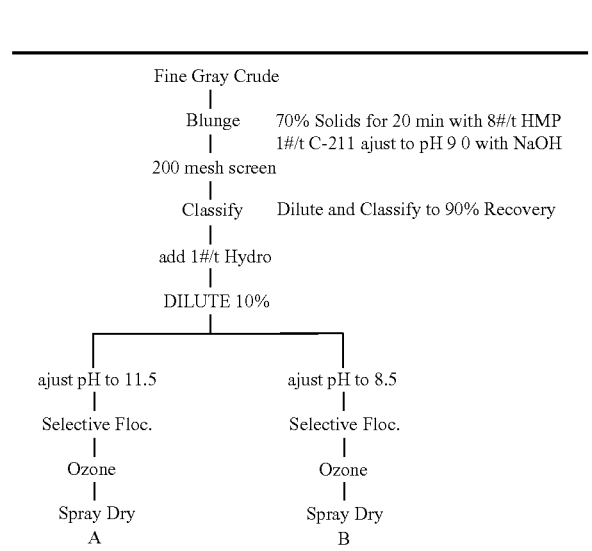

-continued

|  | Classify | A | B |
|---|---|---|---|
| Brightness (GE) |  | 89.23 | 89.96 |
| L |  | 96.26 | 96.24 |
| a |  | −0.3 | −0.12 |
| b |  | 2.99 | 2.29 |
| TiO2 (wt. %) |  | 1.036 | 0.973 |
| Fe2O3 (wt. %) |  | 1.013 | 0.985 |
| Conductivity |  | 432 uS | 221 uS |
| Brookfield viscosity, 70% solids @ 20 rpm |  | 173 | 240 |
| Hercules viscosity, 70% solids @ 1100 rpm |  | 1.6 | 1.6 |
| @ 2200 rpm |  | 3.4 | 3.3 |
| @ 4400 rpm |  | 13.4 | 8.0 |
| Wt. % <2 micron |  | 98.3 | 97.1 |
| Wt. % <1 micron |  | 93.4 | 91.1 |
| Wt. % <0.5 micron |  | 83.7 | 82.2 |
| Wt. % <0.25 micron |  | 59.1 | 58.7 |
| Process product solids | 38.30% | 53.30% | 52.9% |
| >325 mesh residue |  | 0.0036% | 0.00071% |
| product pH | 8.2 | 10.43 | 7.45 |

In Example 4, a fine gray crude was blunged to 70% solids for 20 minutes with 8 pounds per tone HMP and 1 pound per ton C-211. The pH of the blunged product was adjusted to 9.0 with caustic soda, filtered with 200 mesh screen, classified to 90% recovery, mixed with 1 pound per ton hydro, and diluted to 10% solids. The diluted, classified crude was divided in two lots. The first lot adjusted to pH 11.5; the second lot pH adjusted to 8.5. Each lot was then subjected to selective flocculation, ozone, and spray drying in a continuous operation for two days. The properties of the beneficiated product according to the invention are listed in the tables above.

As can be seen from Example 4, dynes rheology high-brightness product can be produced according to the invention under continuous process conditions. Products made with selective flocculation at lower (8.5) pH has 7.5 pH final product, which is within specification for kaolin slurry products. And process solids after the thickener used during the trial were as high as filter cake off of a rotary vacuum filter.

EXAMPLE 5

Prophetic

Beyond the inorganic reducing agents tested in the examples above, we believe that organic and microbiological reducing agents will work. Biotechnological methods for leaching kaolin using *Aspergillus niger, Enterobacter aerogens* and *Leuconostoc mesenteroides* is described by Shelobolina (2000) in the Georgia Geological Society Guidebook, Volume 20, titled "Geology of the Commercial Kaolin Mining District of Central and Eastern Georgia." Bioleaching requires introduction of bacteria and nutrients. We believe that introduction of a bioleaching stage in place of inorganic or organic chemical reducing agents is made possible by the invention because the selective flocculation step enables separation of kaolinite from contaminants such as iron-bearing organic compounds, bacterial matter, nutrient matter or other residues resulting from the bioleaching process. We further believe that an oxidative process such as ozone is required after the selective flocculation process to make the kaolin product fit for use from the standpoint of preventing microbiological contamination of the product shipped to customer.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method for beneficiating and dewatering a kaolin comprising:
   (a) adding a reducing agent and a high molecular weight polymer to a deflocculated aqueous kaolin suspension, wherein the high molecular weight polymer selectively flocculates kaolin from the deflocculated aqueous kaolin suspension to form a flocculated kaolin product;
   (b) separating said flocculated kaolin product from the remainder of the suspension; and
   (c) redispersing the separated kaolin product of (b) to form a deflocculated kaolin having a higher weight-percent solids content than the deflocculated aqueous suspension of (a).

2. The method of claim 1, wherein the kaolin suspension referred to in (a) is chosen from primary kaolin, sedimentary kaolin, micaceous kaolin, sandy, kaolinitio sandstone, saprolite, high alumina-kaolin, bauxitic kaolin, flint clay, fire clay, and ball clay.

3. The method of claim 1, wherein said deflocculated aqueous kaolin suspension referred to in (a) is obtained by a deflocculating method comprising adding at least one chemical agent capable of raising the pH of said aqueous suspension sufficient to facilitate deflocculation.

4. The method of claim 3, wherein said at least one chemical agent is chosen from sodium carbonate, sodium hydroxide, ammonium hydroxide, and mixtures thereof.

5. The method of claim 3, wherein said pH is adjusted to at least 6.

6. The method of claim 5, wherein said pH is adjusted to at least 6.5.

7. The method of claim 3, wherein said deflocculating method further comprises adding at least one dispersing agent.

8. The method of claim 7, wherein said at least one dispersing agent is chosen from polyphosphates, sodium silicates, sodium polyacrylates, and mixtures thereof.

9. The method of claim 1, wherein the deflocculated aqueous suspension referred to in (a) is degritted prior to flocculation.

10. The method of claim 1, wherein said reducing agent is a chemical reducing agent.

11. The method of claim 10, wherein said reducing agent is chosen from sodium hydrosulfite, formamidine sulphinic acid, thiourea dioxide, dithionite, and mixtures thereof.

12. The method of claim 1, wherein said reducing agent is a microbiological reducing agent.

13. The method of claim 12, wherein said reducing agent is a bioleaching agent.

14. The method of claim 13, wherein said bioleaching agent is chosen from *Aspergillus niger, Enterobacter aerogens, Leuconostoc mesenteroides*, and mixtures thereof.

15. The method of claim 13, wherein said redispersion is accomplished with an oxidizing agent.

16. The method of claim 15, wherein said oxidizing agent is ozone.

17. The method of claim 1, wherein said high molecular weight polymer referred to in (a) is chosen from copolymers of acrylamide with at least one organic acid, and mixtures thereof.

18. The method of claim 1, wherein said reducing agent referred to in (a) is added prior to said high molecular weight polymer.

19. The method of claim 1, wherein said reducing agent referred to in (a) is added at the same time as, or after, said high molecular weight polymer.

20. The method of claim 18, wherein said reducing agent is added at least 20 minutes prior to the addition of said high molecular weight polymer.

21. The method of claim 20, wherein said reducing agent is added at least 2 hours prior to the addition of said high molecular weight polymer.

22. The method of claim 18, wherein said high molecular weight polymer is added after a time sufficient to allow complete mixing and action by said reducing agent.

23. The method of claim 1, wherein the separation referred to in (b) is performed in an apparatus chosen from a settling bowl, thickener, centrifuge, hydrocyclone rotary vacuum filter, low pressure filter press, high pressure filter press, and tube press.

24. The method of claim 23, wherein said separation is performed in a thickener.

25. The method of claim 1, wherein the redispersed separated kaolin product of (c) has a greater than or equal to 40 wt % solids.

26. The method of claim 1, wherein the redispersion referred to in (c) is accomplished by a method comprising subjecting the separated kaolin of (b) to at least one polymer-destroying agent.

27. The method of claim 26, wherein said polymer destroying agent is a chemical oxidizing reagent.

28. The method of claim 27, wherein said chemical oxidizing reagent is chosen from sodium hypochloride, hydrogen peroxide, potassium permanganate, and mixtures thereof.

29. The method of claim 26, wherein said polymer destroying agent is a gaseous oxidizing agent.

30. The method of claim 29, wherein said gaseous oxidizing agent is ozone.

31. A method of claim 26, wherein said redispersing comprises adding at least one chemical dispersant and/or the use of high shear mixing.

32. The method of claim 1, wherein the kaolin product of (c) is dewatered.

33. The method of claim 32, wherein said dewatering comprises using a filter press, using a evaporator, or using a membrane filter.

34. The method of claim 32, wherein said dewatered product is dried.

35. A method for beneficiating a kaolin clay comprising:
(a) deflocculating an aqueous suspension of kaolin clay;
(b) adding a reducing agent to said deflocculated aqueous suspension under alkaline conditions;
(c) adding a high molecular weight polymer to selectively flocculate said kaolin clay suspension;
(d) separating said flocculated kaolin clay from the remainder of said suspension; and
(e) redispersing the separated kaolin clay of (d) to form a deflocculated kaolin clay having a higher weight-percent solids content than the deflocculated aqueous suspension of (c).

36. The method of claim 35, wherein said high molecular weight polymer referred to in (c) is chosen from acrylamide and acrylate polymers.

37. A product obtained from the process of claim 1.

38. A product obtained from the process of claim 35.

39. The method of claim 35, further comprising dewatering or drying said deflocculated kaolin clay following (e).

* * * * *

UNITED STATES PATENT AND TRADEMARK OFFICE
CERTIFICATE OF CORRECTION

PATENT NO. : 7,122,080 B2  Page 1 of 1
APPLICATION NO. : 10/214359
DATED : October 17, 2006
INVENTOR(S) : Robert J. Pruett et al.

It is certified that error appears in the above-identified patent and that said Letters Patent is hereby corrected as shown below:

In Claim 2, Column 16, line 26, "sandy, kaolinitio" should read --sandy kaolin, kaolinitic--.

In Claim 23, Column 17, line 25, "hydrocyclone rotary" should read --hydrocyclone, rotary--.

Signed and Sealed this

Thirteenth Day of February, 2007

JON W. DUDAS
*Director of the United States Patent and Trademark Office*